US007271739B2

(12) United States Patent
Higelin

(10) Patent No.: US 7,271,739 B2
(45) Date of Patent: Sep. 18, 2007

(54) GUIDANCE SYSTEM AND NAVIGATION METHOD

(75) Inventor: Jean-Claude Higelin, Hégenheim (FR)

(73) Assignee: Fraport AG Frankfurt Airport Services Worldwide (DE)

( * ) Notice: Subject to any disclaimer, the term of this patent is extended or adjusted under 35 U.S.C. 154(b) by 162 days.

(21) Appl. No.: 10/546,340

(22) PCT Filed: Feb. 19, 2004

(86) PCT No.: PCT/EP2004/001642

§ 371 (c)(1),
(2), (4) Date: Oct. 11, 2005

(87) PCT Pub. No.: WO2004/075148

PCT Pub. Date: Sep. 2, 2004

(65) Prior Publication Data

US 2006/0125657 A1    Jun. 15, 2006

(30) Foreign Application Priority Data

Feb. 19, 2003  (DE) ........................... 203 02 701 U

(51) Int. Cl.
*G08G 1/095* (2006.01)
(52) U.S. Cl. .................. 340/944; 340/572.1; 340/925; 340/573.4; 702/211
(58) Field of Classification Search ............. 340/572.1, 340/573.4, 925, 944, 815.4; 701/211
See application file for complete search history.

(56) References Cited

U.S. PATENT DOCUMENTS 6,025,773 A * 2/2000 Bresnan ................... 340/407.1

| 6,150,943 | A  | * | 11/2000 | Lehman et al. ............. 340/628 |
| 6,472,994 | B1 | * | 10/2002 | Tator ........................ 340/815.4 |
| 6,646,545 | B2 | * | 11/2003 | Bligh ....................... 340/286.05 |
| 6,920,390 | B2 | * | 7/2005  | Mallet et al. ............... 701/120 |
| 6,924,741 | B2 | * | 8/2005  | Tamayama et al. ...... 340/572.1 |
| 2002/0057204 | A1 |   | 5/2002 | Bligh ....................... 340/691.1 |
| 2002/0193973 | A1 | * | 12/2002 | Kinoshita et al. .............. 703/1 |

FOREIGN PATENT DOCUMENTS

GB    2215105    9/1989
WO    WO96/39687    12/1996

* cited by examiner

*Primary Examiner*—Jeffrey Hofsass
*Assistant Examiner*—Hoi C. Lau
(74) *Attorney, Agent, or Firm*—Hayes Soloway P.C.

(57) ABSTRACT

For traffic routing in a walking zone in public buildings, complexes of buildings and traffic zones, which have a plurality of destinations interconnected by traffic routes there are arranged along the traffic routes continuous visual orientation lines which each are associated to one destination, end at the associated destination and can readily be distinguished from each other. The orientation lines are equipped with univocal indicator features pointing towards the associated destination. It is preferably effected by remote control that the orientation lines are composed of display devices which are selectively activated in sections. Remote control is performed in particular by a central control center via a network to which also the control units are connected, which activate the display devices. At easily accessible sites there are installed information terminals where users are identified and user data can be retrieved, especially in combination with an information system outputting user-specific information at selected places of the buildings, traffic routes and destinations. Identification of a user can be performed with the aid of electronic data carriers such as transponders, which can be polled in a contact-free manner.

33 Claims, 6 Drawing Sheets

Fig. 5

Frankfurt Airport

→ ⟦A 15⟧ ⟦Dec. 12, 2003⟧ ⟦09.19⟧

Buenos dias Sra. Ferreyra

→ ⟦→ → → → 12 min⟧ ⟦D 7⟧

⟦AF 1234 → CDG⟧ ⟦dep. 10.55⟧

→ latest boarding ⟦D 7⟧ ⟦→ 10.25⟧
you would be denied boarding after it !

→ ⟦Relax & Shopping up to 50 min.⟧

Today's specials for

--- ✂ ------------------------------

Maria Ferreyra
⟦D⟧ ⟦Shopping Coupon, Dec. 12, 03⟧
25% discount on Chanel 5
⟦Shop: Heinemann⟧ ⟦→⟧ ⟦→⟧ Hall ⟦D⟧
show coupon & boarding card / 1 item/person

--- ✂ ------------------------------

Maria Ferreyra
⟦A⟧ ⟦Shopping Coupon, Dec. 12, 03⟧
Martell XO 1l. bottle: 23.95$
⟦Shop: LiquorStore⟧ ⟦→⟧ ⟦→⟧ Hall ⟦A⟧
show coupon & boarding card / 1 item/person

------------------------------------

GUIDANCE SYSTEM AND NAVIGATION METHOD

The invention relates to a guiding system for a walking zone in buildings, complexes of buildings and traffic zones, which have a plurality of destinations interconnected by traffic routes, as well as to a method of traffic routing in such an environment.

Conventional guiding systems in complexes of buildings, pedestrian zones and the like are based on the use of information signs, which can be provided both with script and symbols. In spacious walking zones one needs a large number of such information signs, because the readability decreases with increasing distance. The larger the number of destinations, the more complex and confusing is the multitude of the required information signs. In an environment where destinations have to be reached without any detours and loss of time, the guiding system is of great importance. Airports which in most cases include several terminals, are an excellent example of such an environment. It is often the case with transit or transfer flights that the passengers have to cover long distances in order to come from one terminal to the next. Avoiding detours and losses of time frequently is the precondition for catching connecting flights. Experience shows that conventional guiding systems often are not identified or understood, at least not in due time. Especially a guiding system which is based on information signs does not provide the desired guidance for each passenger, in particular in an international environment where signs have to be put up which are provided with a lettering in various languages or even different scripts. The concentration of information signs which is necessary at branches prevents a quick identifying and understanding. The view on the information signs is often obstructed, too. The consequences are non-identification, non-observance and a misinterpretation of the given information, up to the point of wrong orientation which makes the passenger to take a direction which is wrong by 180°.

The invention provides a guiding system for such environments, which is distinguished by perfect visibility, perceptibility and availability in each area of the walking zone as well as by intuitive comprehensibility, so that the destinations can be reached on the most direct way and without any loss of time. In the guiding system according to the invention, visual orientation lines are arranged along the traffic routes which interconnect the destinations. These orientation lines can readily be distinguished from each other depending on the associated destination. The orientation lines further are equipped with controllable indicator features pointing towards the associated destination. The orientation lines each end at the associated destination. If all traffic routes of the walking zone are equipped with such orientation lines, the users of the system are able to arrive at the desired destination by simply following the corresponding orientation line. These lines are arranged at a sufficient height on the walls or in the ceiling area "above head height" such that they can be seen well from any place, so that the sight onto the orientation lines can not be obstructed, or perhaps for a very short time only. In building volumes of large vertical extent, the orientation lines may also be arranged in the floor area. No matter, at which place within spacious complexes of buildings a passer-by will stay, he will always find an orientation line for the desired destination and can follow it along traffic routes of any complexity. The guiding system is present always and everywhere. It is unambiguous and leaves no space for misinterpretations or mix-ups. Even if one leaves at will the traffic route leading to the desired destination, for instance to visit a shop, restaurant or recreation room, the orientation will not be lost, because each traffic route reached after having left the visited place is again provided with an orientation line which leads to the desired destination.

Associating the orientation lines to the destinations is effected by means of visual features, in particular colors within the rainbow spectrum, and patterns. Symbols, letters and numerals may be used in addition. The symbols, letters and numerals are arranged along the corresponding orientation lines so as to be spaced from each other.

The physical configuration of the orientation lines can be realized in various ways. Especially colored lighting stripes in combination with pulsing light modulation or running lights are suitable for showing the direction of movement to the destination, as well as light projection equipment and light bands made up of LED elements suspended from a ceiling.

In a particularly advantageous embodiment of the guiding system the orientation lines are associated to the destinations and traffic routes not in an inalterable manner, but according to requirements. With this, it will be possible in an emergency case, for instance, to reroute all traffic routes to escape routes. Further there is the possibility to bypass momentarily overloaded traffic routes, to split up flows of traffic and to make short-term modifications of destinations. If, for instance, a traffic route is temporarily overloaded after arrival of a wide-bodied aircraft, it may be expedient to accept a detour in order to avoid losses of time owing to colliding flows of traffic.

The invention makes provision for walking zones with final destinations, which are reached via common distributor destinations, that the respective orientation lines between distributor destination and final destination are observably different, but have one readily distinguishable, common attribute. A distributor destination may be at the same time a final destination, of course, and there likewise is the option that traffic routes pass through at distributor destinations, in order to lead to other final destinations or distributor destinations.

Further, the subject-matter of the invention is a method of traffic routing in a walking zone of public buildings, complexes of buildings and traffic zones, which have a plurality of destinations interconnected by traffic routes. According to this method, continuous visual orientation lines each associated to one destination are arranged along the traffic routes, which orientation lines end at the associated destination and can readily be distinguished from each other. The orientation lines are provided with univocal visual indicator features pointing towards the associated destination. It is effected by remote control that the orientation lines are composed of display devices which are selectively activated in sections. The remote control is performed by a central control center via a network to which also the control units are connected, which activate the display devices.

An advantageous further development of the guiding system and the method according to the invention is that installed at easily accessible sites are information terminals where users are identified and user data can be retrieved, especially in combination with an information system outputting user-specific information at selected places of the buildings, traffic routes and destinations. Identification of a user can be performed with the aid of electronic data carriers. For realizing such a system it is possible to use known data carriers such as smart cards and transponder chips. The latter are suitable for remote enquiry and may be integrated in boarding cards, for instance. The code stored in boarding cards already contains extensive information on the passenger and his flight data. If, for instance, a transfer passenger approaches an identification station, acoustic and/or visual information can be presented to him, which are useful for him in terms of finding his destination ("Follow the blue orientation line as far as to terminal blue 17"), just like person-related information ("Please call up at home"). Particularly of advantage is the direct individual information of a passenger in the event of a change of flight which has become inevitable due to a delayed flight. In such case the change of flight can be made automatically, and the passenger obtains all current information on the (changed) connecting flight without any loss of time, including a comforting notice that his luggage has been reloaded correspondingly. It is by the guiding system that he will be reliably guided to his destination, the new gate.

In a further development of this concept, which presupposes the use of individual data carriers, the data which is retrieved in a contact-free manner will be used to present messages on display panels to the individual person, for instance special offers, which panels are installed along the way accompanied by orientation lines. Further, at identification stations with automatic data acquisition ("information kiosk"), the passenger is able to request a hardcopy of the relevant flight data in his national language, preferably in the form of a handbill which furthermore comprises detachable coupons which entitle him (and only himself) to buy goods at bargain prices in particular shops at which the orientation lines pass by or to which the orientation lines lead, preferably shops in the vicinity of the destination (in particular of the gate), i.e. places to which the operator of the facility (e.g. airport company) would like to direct the passenger.

Further features and advantages of the invention will become apparent from the following specification and the drawing to which reference is made and in which.

Figure 3:
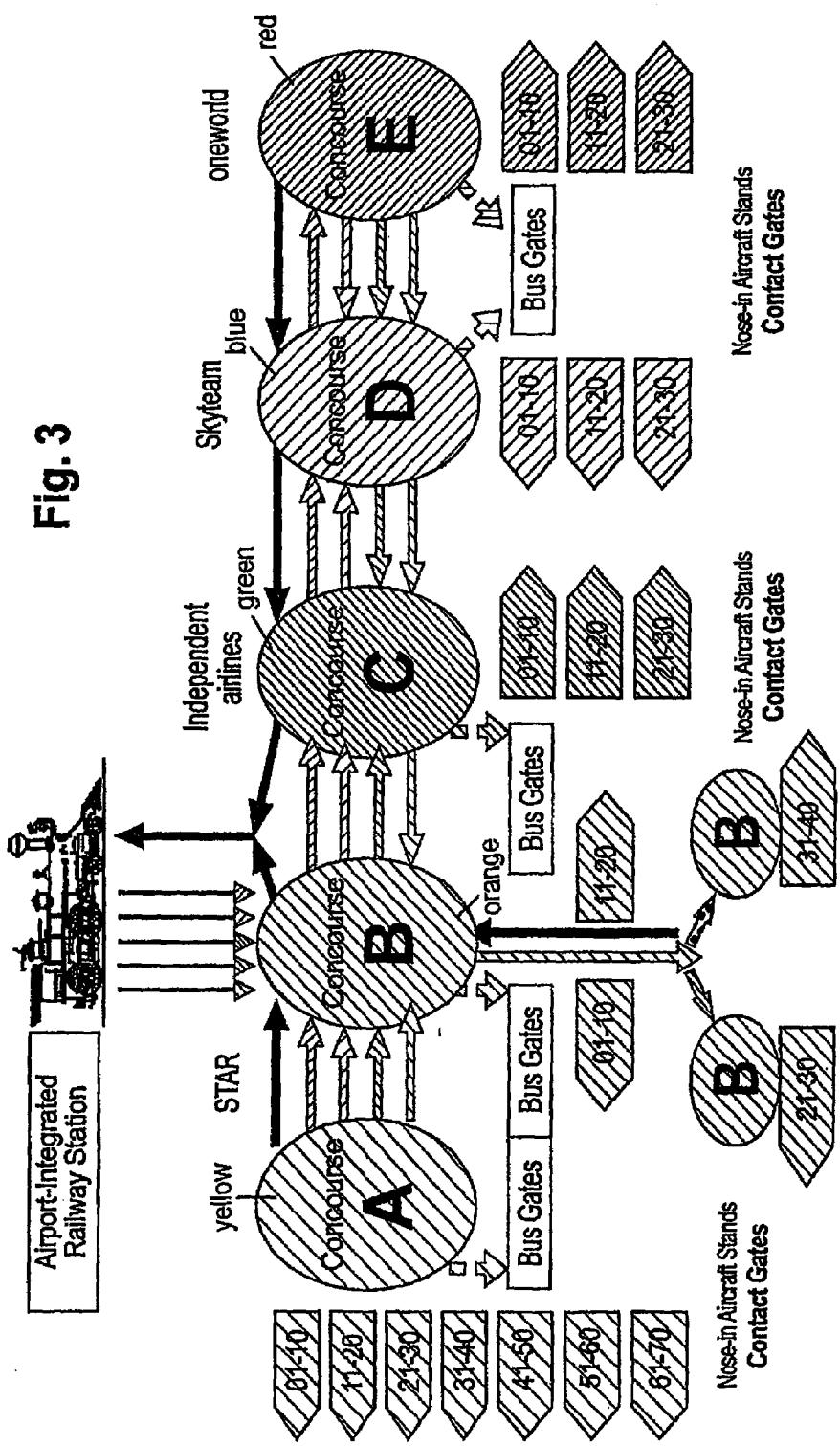
Figure 4:
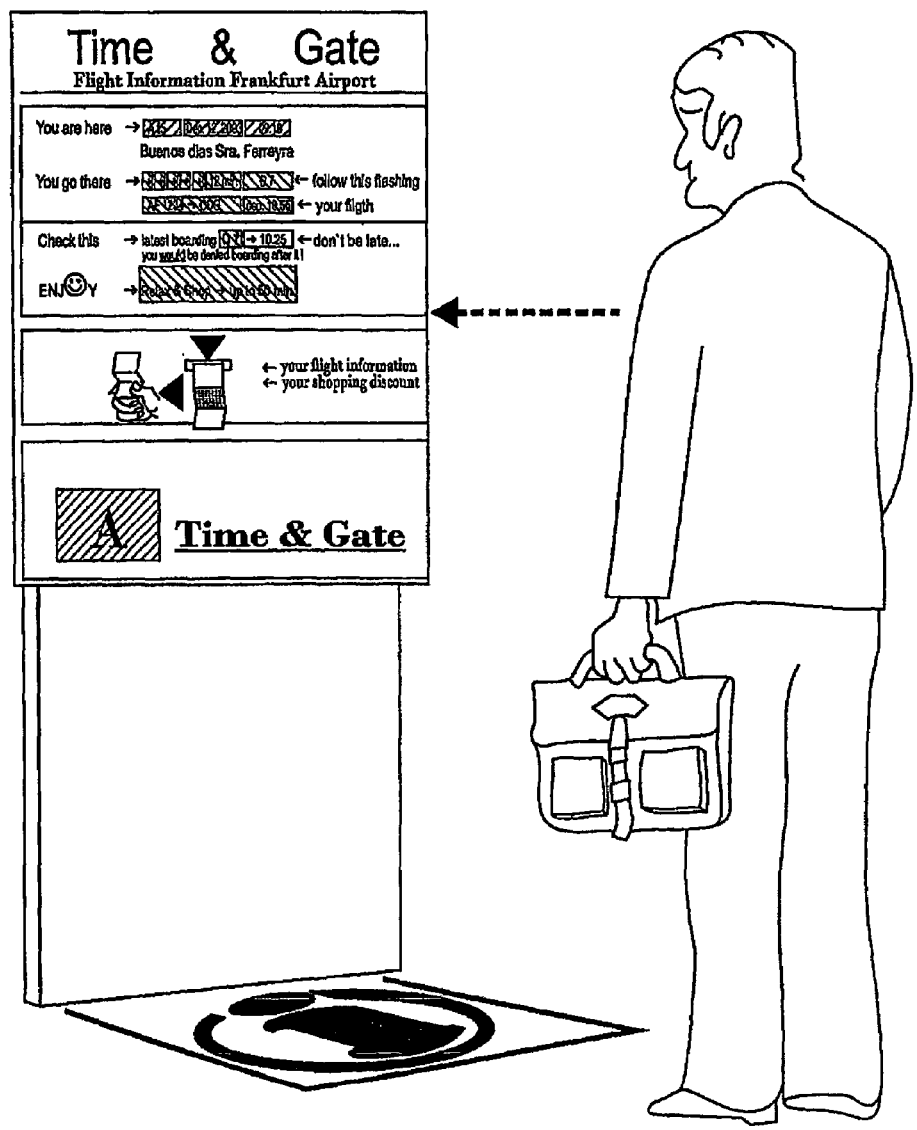
Figure 6:
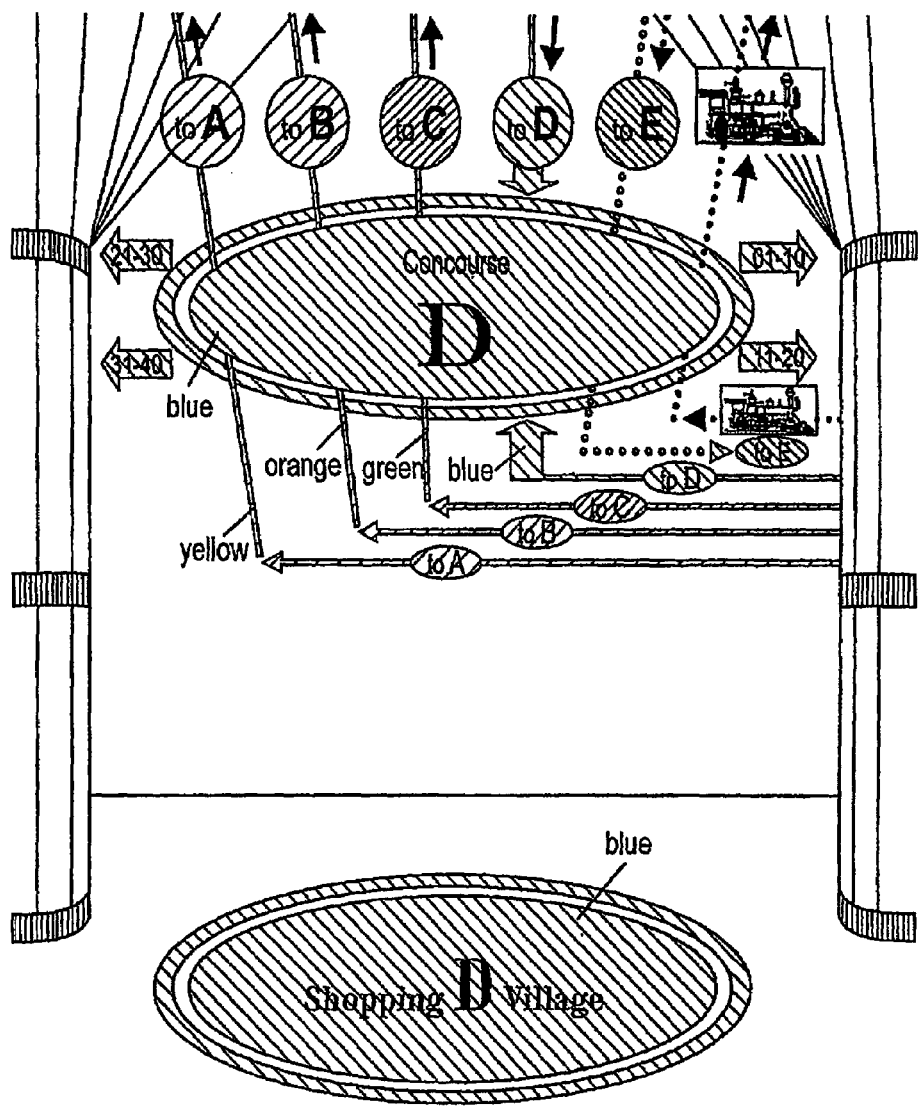

FIG. 3 schematically shows the use of the guiding system according to the invention in the area of a traffic route which interconnects several destinations;

FIG. 4 shows an identification station as perceived by a user;

FIG. 5 shows a person-related handbill delivered from the identification station to a user; and FIG. 6 is the schematic illustration of a destination including traffic routes which lead to it and pass through it.

Figure 1:
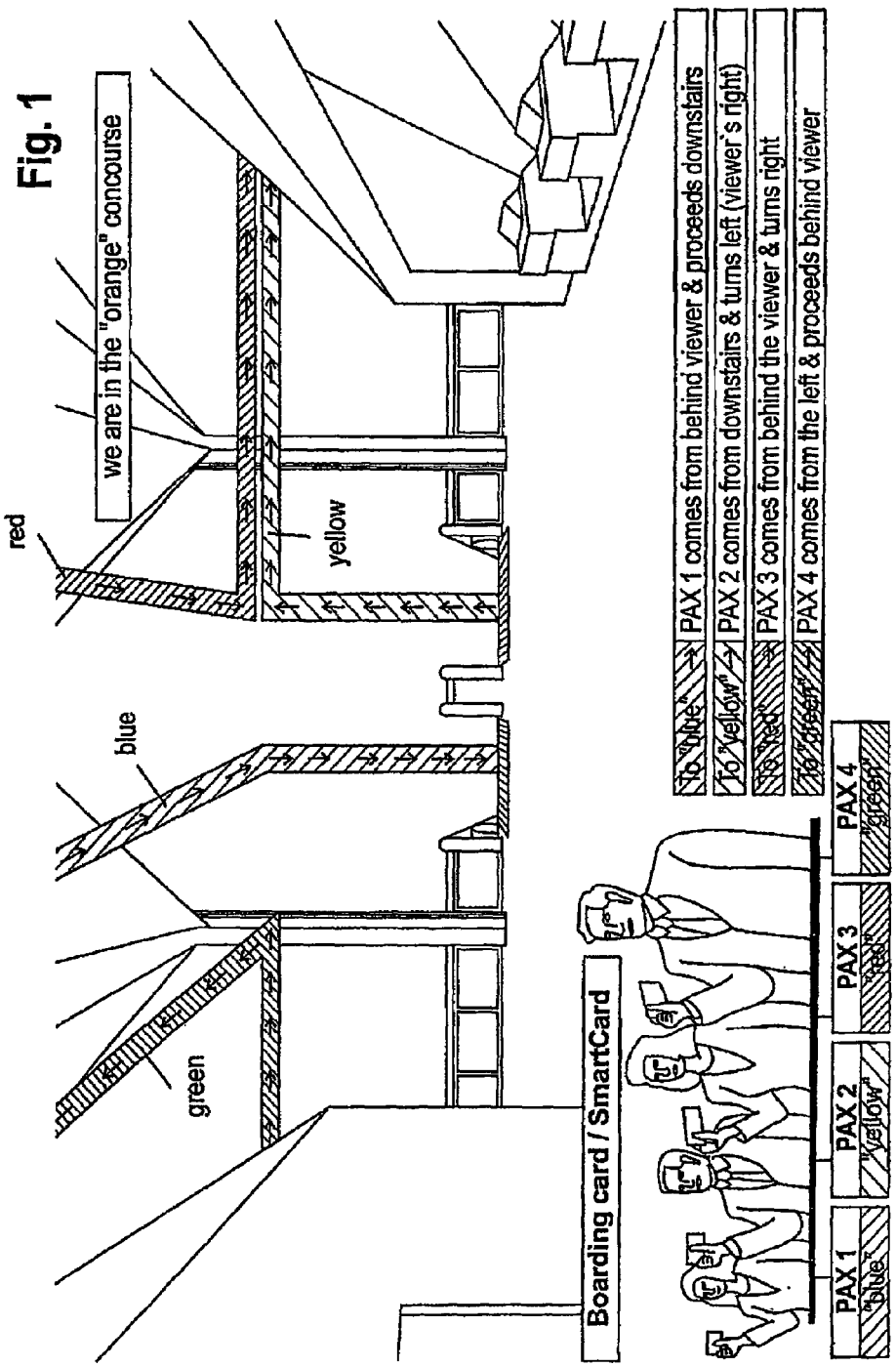
FIG. 1 shows in a schematic perspective view an example of use of the guiding system according to the invention.

The scenario illustrated in FIG. 1 is based on an airport building. A wide corridor ends at a balustrade at which traffic routes branch off to the right and the left, and at which moving stairs run downward and come up from downstairs, respectively. To the sides of the corridor there are arranged check-in desks, shops, toilet rooms and the like. Traffic routes leading to specific destinations are referenced by colored orientation lines with directional symbols. These orientation lines in the form of lighting stripes with a directional indication through pulsing light modulation or running lights are arranged so as to be easily perceptible in the "region above the heads", namely high up the walls or in the ceiling area. The area shown in FIG. 1 is situated in a terminal of an airport and represents a transit area. The scenario illustrated in FIG. 1 shows two moving stairs ending at a balustrade, and four orientation lines (yellow, green, blue, red) which extend in parallelism in sections. A green orientation line comes from the left and extends to behind the viewer of FIG. 1. A blue orientation line comes from behind the viewer and proceeds along the moving stairs running downwards. A red orientation line comes from behind the viewer and turns to the right in front of the moving stairs. A yellow orientation line comes from downstairs via the moving stairs and then turns to the right (as seen by the viewer). Each orientation line belongs to one destination and ends there. The directions oriented towards the aim are each referenced in FIG. 2 by an arrow symbol. These directional arrows, however, are only symbolical. In practical implementations the orientation lines themselves have a direction-indicating character, which is achieved in particular by pulsed light intensity- or color modulation which propagates wavelike, or by running lights, but in any case such that the direction can be unmistakably and clearly identified, with the visual effect, however, remaining discreet and undemonstrative. The arrangement of the orientation lines can be a variable one, for instance, by an orientation line first running over a floor area and then across a side wall area. The orientation lines may also be realized by light projection or by suspended light bands made up of LED elements as well as by dynamic lighting stripes on the floor.

Figure 2:
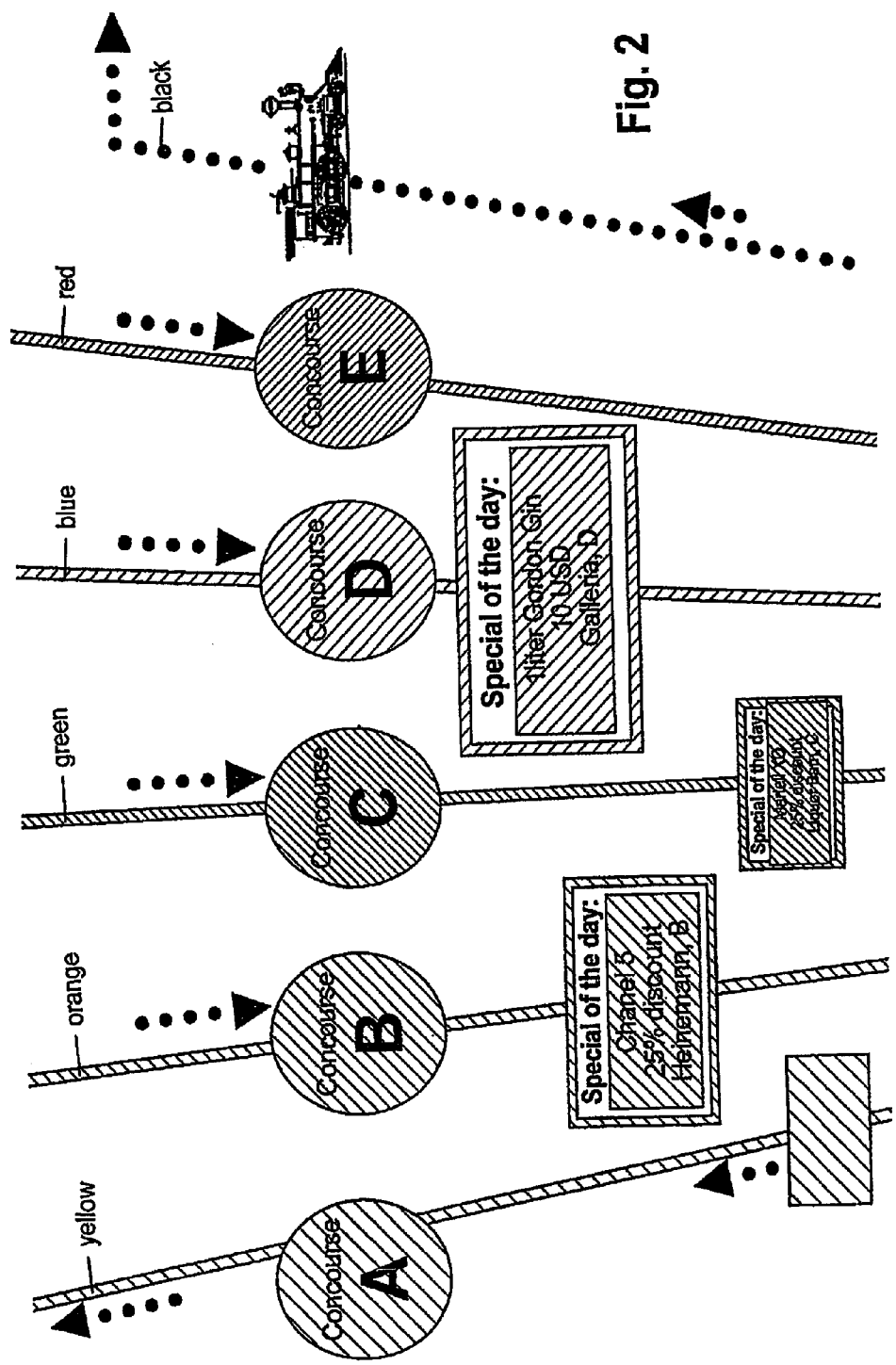
FIG. 2 is a detail view of the example of use with several parallel traffic routes.

FIG. 2 shows five traffic routes which run in parallelism in sections, are accompanied by orientation lines and are each marked with one color and a letter as well as with directional symbols. These are:

A yellow
B orange
C green
D blue
E red.

There is additionally plotted a traffic route in black dots, being marked with a railway symbol.

FIG. 3 is a corresponding schematic overview illustration of an airport with five main terminals referenced by A, B, C, D and E. Each of the terminals A to E represents a destination. Traffic routes may branch off from the terminals, which may lead via distributor destinations to final destinations, namely gates, as shown with terminal B. The traffic routes between the terminals A to E run in parallelism, so that the inner terminals have to be crossed in order to arrive at the outer ones. All traffic routes are provided with indication lines ending at the associated local destination (e.g. a hall in a terminal). The orientation lines differ from each other by the color (combined with the corresponding letters or numerals), which corresponds to the color of the local destination. Traffic routes branching off from the local destinations are equipped with orientation lines which do have the same color as the associated terminal, but differ in terms of patterning or structure, for instance. In the example shown in FIG. 3 a traffic route starts from terminal B, with the gates 1 to 10 as well as 11 to 20 being associated to this traffic route, the latter leading to a distributor destination from which two traffic routes branch off. The first one of these two traffic routes leads to the gates 21 to 30 and is characterized by a pattern with diagonal stripes; the other one leads to the gates 31 to 40 and is characterized by a dot pattern. In the example shown in FIG. 3 it is to be seen that each indication line ends at the associated destination. To give an example, the yellow indication lines associated to terminal A are all provided with indicator features pointing in the same direction. On the other hand, terminal C, for instance, has orientation lines (green) associated to it which point from A to B and from B to C in one direction and from E to D as well as from D to C in the opposite direction. In FIG. 3 the indicator features are indicated by arrow symbols, too; in practical implementations of the orientation lines it will preferably be a matter of lighting—or other display effects, in particular a pulsed light intensity—or color modulation.

FIG. 4 illustrates an identification and information station (or an automatic data acquisition station), which can be part of the guiding system. Numerous stations of this type can be part of the guiding system and are distributed over the traffic routes, arrival places and destinations. A passenger approaching such station can be identified by using his personal smart card or by a contact-free retrieval or remote retrieval with the aid of a transponder carried with one. Suitable transponder chips are known; they may be integrated in the boarding card, for instance. After identification and when having evaluated relevant data, for example the flight data and the individual data of the passenger such as name, language etc., useful information will be presented to the passengers, be it on request or also unasked. In this context, useful information is in particular such information which provides details on the terminal to go to, and the anticipated required time for reaching the destination, but also information of commercial nature, in particular sales promotion. As the station is also able to identify the nationality of a passenger, the information can also be output visually and/or acoustically in the respective national language.

In the embodiment, illustrated in FIG. 4, of the identification station with automatic data acquisition there is additionally made provision that a printed handbill is delivered. On this handbill the passenger will find all the data, which is relevant for his continuation of the journey or for his destination, in the form of a clearly printed hardcopy, including an individual address of welcome. FIG. 5 shows an example of such a handbill. This contains in particular an information on place and time,
an individual address of welcome,
flight data for a further flight including information on the way to the gate, the estimated time for moving to this place and the denied boarding time out,
personal warrants in the form of detachable coupons for buying specific goods in particular shops at special conditions.

These data will be output in the national language of the respective user (audio/visual/hardcopy).

The personal warrants are preferably adapted to the known preferences of the respective passenger, which may be determined by the country of origin, for instance.

FIG. 6 shows a typical distributor destination; various traffic routes to final destinations branch off from this distributor destination, and at the same time traffic routes start from it which lead to other distributor destinations. FIG. 5 concerns the distributor destination "D blue" at which the traffic route "blue" ends. Final destinations are the gates 01 to 10, 11 to 20, 21 to 30 and 31 to 40, to which one traffic route branches off in each case. A traffic route (red) leading to terminal E passes through distributor destination D. Same may apply to the traffic routes leading to the terminals A, B and C.

The associating of the orientation lines to the traffic routes is not a static one, but is effected according to requirements by remote control through a central guiding station, to which the control units of the visual display devices are connected via a network.

The guiding system may be applied in general in public or private environments both with horizontal and vertical extension, i.e. except for airports and railway stations also in high-rise buildings, stadiums, car parks or parking blocks, pedestrian zones, shopping centers and the like.

The invention claimed is:

1. A guiding system for a walking zone in public buildings, complexes of buildings and traffic zones, which have a plurality of destinations interconnected by traffic routes, wherein continuous visual orientation lines are arranged along the traffic routes,
the orientation lines differ from each other by different, readily distinguishable visual features, in particular colors,
the orientation lines are equipped with indicator features pointing towards the associated destination,
the orientation lines end at the associated destination,
the orientation lines are defined by display devices which can be selectively activated in sections;
characterized in that
orientation lines with different visual features are associated with different destinations,
traffic routes leading to a plurality of destinations are accompanied by a plurality of continuous orientation lines each corresponding to one of the destinations,
the destinations include distributor destinations and final destinations, and traffic routes branching out to final destinations end at a distributor destination, traffic routes provided with associated orientation lines and leading to other destinations passing through said distributor destination,
arranged along the traffic routes are identification stations where users are identified and user data is retrieved; and
an information system outputs user-specific information at selected places of the buildings, traffic routes and destinations.

2. The guiding system according to claim 1, wherein the orientation lines are accompanied by information symbols which are associated with the respective destinations.

3. The guiding system according to claim 1, wherein the destinations are marked in the same color as the orientation lines leading to them.

4. The guiding system according to claim 1, wherein the orientation lines of various destinations differ from each other by different visual patterns.

5. The guiding system according to claim 1, wherein the orientation lines are realized by lighting elements which are continually perceptible.

6. The guiding system according to claim 1, wherein the indicator features of the orientation lines are implemented by pulsed light intensity- or color modulation propagating wavelike.

7. The guiding system according to claim 1, wherein the indicator features of the orientation lines are implemented by running lights.

8. The guiding system according to claim 1, wherein the orientation lines are variably assigned to the traffic routes and can be activated and deactivated in sections according to requirements in order to reroute flows of traffic.

9. The guiding system according to claim 8, wherein the destinations of the orientation lines can be rerouted to escape routes.

10. The guiding system according to claim 8, wherein at least some of the orientation lines arranged along the traffic routes can be selectively activated and deactivated.

11. The guiding system according to claim 8, wherein the indicator features of at least some of the orientation lines, arranged along the traffic routes, can be reversed.

12. The guiding system according to claim 9, wherein the indicator features of at least some of the orientation lines, arranged along the traffic routes, can be reversed.

13. The guiding system according to claim 10, wherein the indicator features of at least some of the orientation lines, arranged along the traffic routes, can be reversed.

14. The guiding system according to claim 1, wherein the respective orientation lines between distributor destination and final destination are observably different, but have one readily distinguishable, common attribute.

15. The guiding system according to claim 14, wherein the users are provided with data carriers, in particular transponder devices, which are read out at the identification stations.

16. The guiding system according to claim 1, wherein the orientation lines are arranged above head height.

17. The guiding system according to claim 1, wherein the orientation lines are partially arranged in the floor area.

18. The guiding system according to claim 1, wherein the system is used in an airport having several terminal halls as local destinations.

19. The guiding system according to claim 1, wherein the system is used in at least one of the following locations:
- a shopping center;
- an airport;
- a railway station;
- a pedestrian zone;
- an amusement park;
- a sports stadium;
- an exhibition site;
- a car park;
- a parking block; and
- a high-rise building.

20. A method of traffic routing in a walking zone of public buildings, complexes of buildings and traffic zones, which have a plurality of destinations interconnected by traffic routes, in which continuous visual orientation lines are arranged along the traffic routes, which orientation lines can readily be distinguished from each other, in particular by their color, the orientation lines further being provided with univocal visual indicator features pointing towards the associated destination, and the orientation lines, by remote control, further being composed of display devices which are selectively activated in sections,
wherein:
orientation lines having different visual features are associated to various destinations,
traffic routes leading to a plurality of destinations are accompanied by a plurality of orientation lines each corresponding to one of the destinations,
the destinations include distributor destinations and final destinations, and traffic routes branching out to final destinations end at a distributor destination, traffic routes provided with associated orientation lines and leading to other destinations passing through said distributor destination; and
users are provided with data carriers storing individual data, that the data is retrieved in a contact-less manner at identification stations which are installed at selected places of the walking zone, and that in response to this the user receives current and user-specific information.

21. The method according to claim 20, wherein the direction indicated by the visual indicator features is reversed by remote control according to requirements.

22. The method according to claim 20, wherein the traffic routing established by the orientation lines is varied by remote control and according to requirements, in that the display devices are activated along differing traffic ways.

23. The method according to claim 21, wherein the traffic routing established by the orientation lines is varied by remote control and according to requirements, in that the display devices are activated along differing traffic ways.

24. The method according to claim 22, wherein the user-specific information comprises visual indication and/or by voice and/or printing and delivering on a handbill.

25. The method according to claim 23, wherein the user-specific information comprises visual indication and/or by voice and/or printing and delivering on a handbill.

26. The method according to claim 24, wherein the user-specific information also takes into account country-specific preferences.

27. The method according to claim 25, wherein the user-specific information also takes into account country-specific preferences.

28. The method according to claim 22, wherein along the traffic routes accompanied by the orientation lines, information which is in relation to the user-specific information is presented to the user on display panels.

29. The method according to claim 23, wherein the traffic routing established by the orientation lines is varied by remote control and according to requirements, in that the display devices are activated along differing traffic ways.

30. The method according to claim 24, wherein the traffic routing established by the orientation lines is varied by remote control and according to requirements, in that the display devices are activated along differing traffic ways.

31. The method according to claim 25, wherein the traffic routing established by the orientation lines is varied by remote control and according to requirements, in that the display devices are activated along differing traffic ways.

32. The method according to claim 26, wherein the traffic routing established by the orientation lines is varied by remote control and according to requirements, in that the display devices are activated along differing traffic ways.

33. The method according to claim 27, wherein the traffic routing established by the orientation lines is varied by remote control and according to requirements, in that the display devices are activated along differing traffic ways.

* * * * *